United States Patent
Mattsson

(10) Patent No.: US 11,994,206 B2
(45) Date of Patent: May 28, 2024

(54) DUAL PLANETARY GEAR TRANSMISSION CONTROLLED BY COMBINED PARKING AND SERVICE BRAKES

(71) Applicant: VOLVO CONSTRUCTION EQUIPMENT AB, Eskilstuna (SE)

(72) Inventor: Per Mattsson, Sölvesborg (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 18/374,441

(22) Filed: Sep. 28, 2023

(65) Prior Publication Data

US 2024/0117878 A1    Apr. 11, 2024

(30) Foreign Application Priority Data

Oct. 5, 2022 (EP) ..................................... 22199882

(51) Int. Cl.
*F16H 57/10* (2006.01)
*F16H 3/64* (2006.01)
(Continued)

(52) U.S. Cl.
CPC ............... *F16H 57/10* (2013.01); *F16H 3/64* (2013.01); *F16H 57/02* (2013.01); *F16H 57/0484* (2013.01); *F16H 59/40* (2013.01); *F16H 61/0059* (2013.01); *F16H 61/682* (2013.01); *F16H 61/686* (2013.01); *F16H 63/3026* (2013.01); *F16H 3/44* (2013.01); *F16H 2003/442* (2013.01); *F16H 3/46* (2013.01); *F16H 2057/02034* (2013.01); *F16H 2057/02052* (2013.01); *F16H 2057/02056* (2013.01); *F16H 2200/0021* (2013.01); *F16H 2200/0034* (2013.01); *F16H 2200/2007* (2013.01); *F16H 2200/2035* (2013.01)

(58) Field of Classification Search
None
See application file for complete search history.

(56) References Cited

U.S. PATENT DOCUMENTS 4,702,125 A * 10/1987 Kalns .................... F16H 37/082
   475/287
5,700,220 A    12/1997 Legner
(Continued)

FOREIGN PATENT DOCUMENTS

CN    2668926 Y  * 11/2003
EP    4075023 A1   10/2022
WO    2021078372 A1   4/2021

OTHER PUBLICATIONS

Extended European Search Report, European Application No. 22199882.6, mailed Mar. 17, 2023, 17 pages.

*Primary Examiner* — Timothy Hannon
(74) *Attorney, Agent, or Firm* — Sage Patent Group

(57) ABSTRACT

The present disclosure relates to a transmission arrangement. The transmission arrangement comprises at least a first and a second planetary gear set and a first and a second brake mechanism respectively configured to optionally apply a braking torque to a respective member of the respective planetary gear set. Each one of the first and second brake mechanisms comprises a respective brake disc, a normally disengaged brake for acting on the brake disc, and a normally engaged brake for acting on the brake disc.

13 Claims, 5 Drawing Sheets

(51) Int. Cl.
  *F16H 57/02*  (2012.01)
  *F16H 57/04*  (2010.01)
  *F16H 59/40*  (2006.01)
  *F16H 61/00*  (2006.01)
  *F16H 61/682*  (2006.01)
  *F16H 61/686*  (2006.01)
  *F16H 63/30*  (2006.01)
  *F16H 3/44*  (2006.01)
  *F16H 3/46*  (2006.01)

(56) References Cited

U.S. PATENT DOCUMENTS

| | | | | |
|---|---|---|---|---|
| 2019/0113109 | A1* | 4/2019 | Mordukhovich | B60K 17/08 |
| 2022/0333670 | A1* | 10/2022 | Mattsson | F16H 3/66 |
| 2022/0389989 | A1* | 12/2022 | Mattsson | B60K 17/06 |
| 2023/0106800 | A1* | 4/2023 | Hand | F16H 3/663 |
| | | | | 475/271 |

* cited by examiner

DUAL PLANETARY GEAR TRANSMISSION CONTROLLED BY COMBINED PARKING AND SERVICE BRAKES

CROSS REFERENCE TO RELATED APPLICATIONS

This application claims priority to European Patent Application No. 22199882.6, filed on Oct. 5, 2022, the disclosure and content of which is incorporated by reference herein in its entirety.

TECHNICAL FIELD

The present disclosure relates to a transmission arrangement. The present disclosure also relates to a working machine comprising such a transmission arrangement. The disclosed subject matter is applicable on working machines within the fields of industrial construction machines or construction equipment, in particular articulated or rigid haulers. Although the present disclosure will be described with respect to a rigid hauler, the disclosed subject matter is not restricted to this particular machine, but may also be used in other working machines such as wheel loaders, excavators, and backhoe loaders.

BACKGROUND

In connection with transportation of heavy loads at construction sites or the like, a working machine is often used. The working machines may be utilized for transportations in connection with road or tunnel building, sand pits, mines, forestry, and similar environments, and are often provided in the form of an articulated hauler or a rigid hauler.

Recently, not only cars are using electric machines as prime mover(s) for propulsion, also working machines are striving to use such more environmentally friendly prime mover. However, within the rough terrain at which the working machine is frequently operated, it is required that the vehicle is able to operate in a desired manner, and high quality of the vehicle gearbox is necessary.

Conventionally, the gearbox is arranged for adjusting the speed and strength of the vehicle in dependency of the specific driving scenario. The gearbox comprises a transmission arrangement and depending on the specific type of gearbox, the transmission arrangement may comprise e.g. gear wheels in meshed connection with each other or planetary gear sets comprising a respective sun gear, ring gear and a planet carrier, or a transmission arrangement having a combination of gear wheels in meshed connection and one or more planetary gear sets.

WO 2021/078372 discloses a transmission arrangement comprising an input shaft connectable to a prime mover, and an output shaft. The transmission arrangement further comprises two planetary gear sets operatively connected between the input shaft and the output shaft, and two brake discs, each of which is operatively connected to a member of each planetary gear sets such that the gear ratio between the input shaft and the output shaft can be controlled by applying a braking force to one of said two brake discs using a respective normally disengaged brake acting on the respective brake disc.

A drawback of this transmission arrangement is that the normally disengaged brakes need a constant fluid pressure to be applied during times when the respective brake disc is to be locked, which in turn consumes energy.

U.S. Pat. No. 5,700,220 A discloses a transmission arrangement comprising an input shaft connectable to a prime mover, and an output shaft. The transmission arrangement further comprises one planetary gear set operatively connected between the input shaft and the output shaft, and a brake disc operatively connected to a member of the planetary gear set such that the gear ratio between the input shaft and the output shaft can be controlled by applying a braking force the brake disc using a respective normally disengaged brake acting on the brake disc.

A drawback of this transmission arrangement is that the normally disengaged brake needs a constant fluid pressure to be applied during times when the brake disc is to be locked, which in turn consumes energy.

Due to the difference in speed range of an electric machine compared to a conventional internal combustion engine (ICE), the operational demands for a gearbox of an electrically propelled vehicle differs from an ICE propelled vehicle. There is thus a desire to further improve the gearbox for a working machine, especially with regards to increasing the energy efficiency of the transmission arrangement.

SUMMARY

An object of the present disclosure is to provide a transmission arrangement that mitigates the above described deficiencies.

According to a first aspect of the present disclosure this object is achieved by a transmission arrangement according to claim 1.

The transmission arrangement comprises a first planetary gear set comprising a first set of planetary members. The first set of planetary members comprises a first sun gear, a first ring gear and a first planet carrier carrying a first set of planet gears. The first set of planet gears are in meshing engagement with the first ring gear and the first sun gear.

The transmission arrangement further comprises a second planetary gear set comprising a second set of planetary members. The second set of planetary members comprises a second sun gear, a second ring gear and a second planet carrier carrying a second set of planet gears. The second set of planet gears are in meshing engagement with the second ring gear and the second sun gear.

A first member of the first set of planetary members is operatively connected to a first member of the second set of planetary members, and a second member of the first set of planetary members is operatively connected to a second member of the second set of planetary members.

The transmission arrangement further comprises:
- an input shaft connectable to a prime mover, the input shaft being operatively connected to the first sun gear,
- an output shaft operatively connected to the first planet carrier,
- a transmission housing, and
- a gear selection arrangement comprising a first brake mechanism and a second brake mechanism.

The first brake mechanism comprises a first brake disc connected to one of the members of the first set of planetary members. The first brake mechanism further comprises a first normally disengaged brake attached to the transmission housing and configured to act on the first brake disc to control friction between the first brake disc and the first normally disengaged brake. Also, the first brake mechanism comprises a first normally engaged brake attached to the transmission housing and configured to act on the first brake disc to control friction between the first brake disc and the first normally engaged brake.

The first normally disengaged brake is operable by a first fluid pressure to be forced against the first brake disc by the first fluid pressure. The first normally engaged brake is spring biased against the first brake disc and operable by a second fluid pressure to be forced away from the first brake disc by the second fluid pressure.

It should be understood that the first normally disengaged brake and the first normally engaged brake could be integrated in a common mechanism, such as in the embodiment shown in FIG. 3, or they could be implemented as separate mechanisms. In the FIG. 3 embodiment, the first normally engaged brake acts on the first brake disc indirectly by forcing the first normally disengaged brake against the first brake disc. In other embodiments, the first normally engaged brake could be configured to act directly on the first brake disc, for example by providing the first normally disengaged brake and the first normally engaged brake as two separate units. Both separate units may be attached to a single caliper or they may be attached to a respective one of two calipers. The calipers may be floating calipers or fixed calipers, as known in the art.

The second brake mechanism comprises a second brake disc connected to one of the members of the second set of planetary members. The second brake mechanism further comprises a second normally disengaged brake attached to the transmission housing and configured to act on the second brake disc to control friction between the second brake disc and the second normally disengaged brake. Also, the second brake mechanism comprises a second normally engaged brake attached to the transmission housing and configured to act on the second brake disc to control friction between the second brake disc and the second normally engaged brake. The second normally disengaged brake is operable by a third fluid pressure to be forced against the second brake disc by the third fluid pressure, and the second normally engaged brake is spring biased against the second brake disc and operable by a fourth fluid pressure to be forced away from the second brake disc by the fourth fluid pressure.

It should be understood that the second normally disengaged brake and the second normally engaged brake could be integrated in a common mechanism, such as the embodiment shown in FIG. 3, or they could be implemented as separate mechanisms. In the FIG. 3 embodiment, the second normally engaged brake acts on the second brake disc indirectly by forcing the second normally disengaged brake against the second brake disc. In other embodiments, the second normally engaged brake could be configured to act directly on the second brake disc, for example by providing the second normally disengaged brake and the second normally engaged brake as two separate units. Both separate units may be attached to a single caliper or they may be attached to a respective one of two calipers. The calipers may be floating calipers or fixed calipers, as known in the art.

The transmission arrangement is adapted to assume a first gear ratio when the first brake disc is locked to the transmission housing by the first brake mechanism and the second brake disc is rotatable relatively the transmission housing. Also, the transmission arrangement is adapted to assume a second gear ratio when the second brake disc is locked to the transmission housing by the second brake mechanism and the first brake disc is rotatable relatively the transmission housing.

The normally disengaged brake functions as a service brake, i.e. a type of brake biased away from the brake disc to apply less or no frictional force to the brake disc in normal operation when no braking force on the brake disc is desired. For example a coil spring, disc spring or some other suitable resilient member, may be used to provide said bias. The service brake is temporarily engaged by application of external force when increased braking friction is desired, typically by application of an increased hydraulic pressure or by operation of any suitable means of mechanical actuation allowing control of the brake force applied by the normally disengaged brake. The normally disengaged brake allows improved control of the amount of friction between the respective brake disc and the normally disengaged brake. The normally disengaged brake is mounted such that it cannot rotate together with the brake disc.

The normally engaged brake functions as a parking brake, i.e. a brake which is biased towards the brake disc to apply enough frictional force to prevent the brake disc from rotating relatively the normally engaged brake and thus relatively the transmission housing, for example when the vehicle is parked. The biasing force may be provided by a coil spring, disc spring or some other suitable resilient member. The parking brake is subsequently disengaged by application of external force when decreased braking friction is desired, typically by application of an increased hydraulic pressure or by any suitable means of mechanical actuation. Since the parking brake does not rely on provision of hydraulic pressure to allow it to lock the brake disc, the parking brake does not use any energy when locking the brake disc. The normally engaged brake is mounted such that it cannot rotate together with the brake disc.

The herein proposed combined use of a normally disengaged brake and a normally engaged brake on each brake disc enables improved control of the amount of friction applied to the respective brake disc, such that slipping of the respective brake disc can be better controlled during change of gear ratio, whilst the normally engaged brake enables energy efficient locking of each respective brake disc, both while driving and while the vehicle is parked.

When only one of the brake discs is locked, a respective gear ratio is assumed. When both brake discs are locked, the output shaft of the transmission arrangement is prevented from rotating, thereby preventing rotation of wheels operatively connected to the output shaft, such that a vehicle provided with the transmission assembly can be kept stationary when parked.

Accordingly, the transmission arrangement provides a two-stage transmission which is particularly advantageous for use in combination with a prime mover in the form of an electric machine. The prime mover may thus be an electric machine.

The first brake mechanism may comprise a first brake caliper and the second brake mechanism may comprise a second brake caliper.

The transmission housing may comprise a transmission housing wall assembly defining a transmission housing cavity enclosing at least the first and second planetary gear sets, wherein the first and second brake mechanisms are located on one side of the transmission housing wall assembly and the transmission housing cavity is located on an opposite side of the transmission housing wall assembly.

The transmission housing cavity may comprise a transmission lubrication liquid.

The first brake disc may be connected to the first ring gear.

The second brake disc may be connected to the second ring gear.

The first ring gear may be operatively connected to the second planet carrier.

The first sun gear may be operatively connected to the second sun gear.

According to a second aspect of the present disclosure, the above mentioned object is also achieved by a method of operating the gear selection arrangement of the transmission arrangement described above. The method comprises:

changing gear ratio from the first gear ratio to the second gear ratio by:
increasing the first fluid pressure such that the first normally disengaged brake engages and locks the first brake disc to the transmission housing,
increasing the second fluid pressure such that the first normally engaged brake does not lock the first brake disc to the transmission housing,
gradually decreasing the first fluid pressure whilst gradually increasing the third fluid pressure such that both the first brake mechanism and the second brake mechanism assume a respective slipping condition and eventually transition to a condition in which the first brake disc is free to rotate and the second brake disc is locked to the transmission housing by the second normally disengaged brake. Then, the fourth fluid pressure is decreased until the second normally engaged brake locks the second brake disc to the transmission housing. Finally, the third fluid pressure is decreased such that the second normally disengaged brake does not lock the second brake disc to the transmission housing.

The method may comprise triggering said change of gear ratio from the first gear ratio to the second gear ratio in response to a rotational speed of the output shaft exceeding a first speed threshold.

According to a third aspect of the present disclosure, the above mentioned object is also achieved by a method of operating the gear selection arrangement of the transmission arrangement described above, said method comprising the steps of:

changing gear ratio from the second gear ratio to the first gear ratio by:
increasing the third fluid pressure such that the second normally disengaged brake engages and locks the second brake disc to the transmission housing,
increasing the fourth fluid pressure such that the second normally engaged brake does not lock the second brake disc to the transmission housing,
gradually decreasing the third fluid pressure whilst gradually increasing the first fluid pressure such that both the first brake mechanism and the second brake mechanism assume a respective slipping condition and eventually transition to a condition in which the second brake disc is free to rotate and the first brake disc is locked to the transmission housing by the first normally disengaged brake,
decreasing the second fluid pressure until the first normally engaged brake locks the first brake disc to the transmission housing, and
decreasing the first fluid pressure such that the first normally disengaged brake does not lock the first brake disc to the transmission housing.

The method may comprise a step of triggering said change of gear ratio from the second gear ratio to the first gear ratio in response to a rotational speed of the output shaft subceeding a second speed threshold.

According to a fourth aspect of the present disclosure, the above mentioned object is also achieved by a working machine comprising the transmission arrangement described above and a prime mover connected to the input shaft of the transmission arrangement. The prime mover may be an electric motor. The working machine may for example be an articulated or rigid hauler, a wheel loader, an excavator, or a backhoe loader.

Further features of, and advantages with, the present disclosure will become apparent when studying the appended claims and the following description. The skilled person will realize that different features of the present disclosure may be combined to create embodiments other than those described in the following, without departing from the scope of the present disclosure, which is limited only by the appended independent claims.

DETAILED DESCRIPTION

Figure 1:
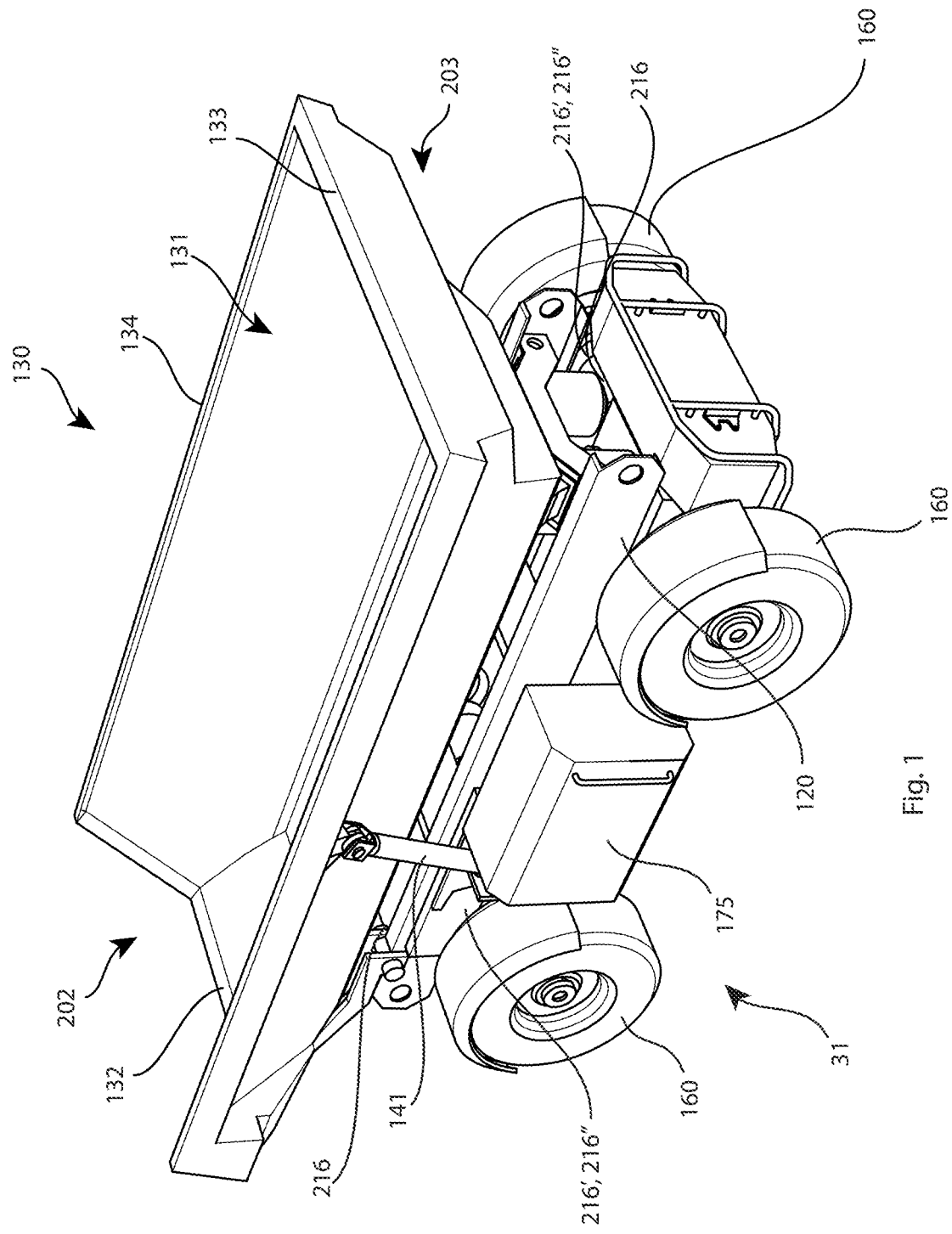
FIG. 1 is a perspective view of a working machine according to one embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference numerals refer to like elements throughout the description and drawings. A table of reference numerals is provided at the end of the description.

FIG. 1 shows an exemplary embodiment of a working machine 31 according to an aspect of the present disclosure. The inventive concept of the present disclosure is applicable on any working machines within the fields of industrial construction machines or construction equipment, in particular dumpers/haulers. Although the present disclosure will be described with respect to a rigid hauler, the disclosed subject matter is not restricted to this particular machine, but may also be used in other working machines such as articulated haulers, excavators, backhoe loaders and wheel loaders.

As seen in FIG. 1 the working machine 31 comprises a dump body 130 for accommodating a load. Merely as an example, and as is indicated in FIG. 1, the dump body 130 may be a loading platform of the working machine 31. The working machine 31 is adapted to have a load receiving condition in which the dump body 130 comprises an open load receiving area 131 outwardly delimited by a load receiving area circumference 134. Generally, the open load receiving area 131 may be an area that is directly accessible from the environment surrounding the working machine 31. For instance, the open load receiving area 131 may be an area that is directly accessible from the above of the dump body 130.

The working machine 31 does not have a driver seat, but is intended to be autonomously and/or remotely driven. The working machine 31 further comprises a first side 203 and a second side 202 arranged opposite to the first side 203, the second side 202 being a load dumping side 202. The first side 203 may also be referred to as an opposite side 203. The opposite side 203 may be used as a front end side when the machine is driven in the direction that puts the opposite side 203 first. However, the working machine 31 may be drivable in any direction, i.e. it is bidirectional. Further, the dump body 130 comprises a load dumping end portion 132 arranged on the working machines load dumping side 202, and an opposite end portion 133 arranged on the working machines opposite side 203.

Further, still referring to FIG. 1 the working machine 31 comprises a working machine frame 120 to which a pair of propulsion axles 216 is mounted. Each propulsion axle 216 comprises, amongst other things, drive shafts 216', 216". The working machine frame 120 further supports the dump body 130, and thereby carries the load of anything contained in the dump body 130 as well as the weight from the dump body itself. The propulsion axles 216 are connected to ground engaging members 160 for driving the ground engaging members 160. In FIG. 1 the ground engaging members 160 are illustrated as wheels, however, they may also be crawlers.

Further, a prime mover 15, in the following referred to as an electric motor (see FIG. 2) is installed onto the propulsion axle 216 and coupled to the drive shafts 216', 216". As will be evident from FIG. 2, the electric motor 15 is coupled to the drive shafts 216', 216" via a transmission arrangement 1. The working machine may comprise one electric motor 15 on each propulsion axle 216.

Still further, the working machine 31 may comprise a tilting arrangement, such as a tilting arrangement comprising one or more tilting actuators 141, such as hydraulic actuators, for tilting the dump body 130 of the working machine 31. The tilting arrangement is in one end attached to the frame 120 and in the other end to the dump body 130. In some embodiments, the tilting arrangement comprises two tilting actuators 141 arranged at different sides of the dump body to ensure a stable tilting (not shown).

FIG. 1 finally discloses an electrical control arrangement 175, arranged to the frame of the working machine 31. The electrical control arrangement 175 may comprise a power source (not shown) e.g. a battery arrangement, for supporting the electric motor 15 and any other components with power. Further, the electrical control arrangement 175 may comprise a control unit (not shown) for controlling the working machine 31. The control unit may be capable of receiving a remote control signal to enable the working machine 31 to be remotely controlled. Such a signal may be received from an external transmitting unit (not shown). It may further be capable of communicating any information to or from the working machine 31 from or to a remote server (not shown). Such information may comprise usage data, service information, battery status, load, weight, capacity utilization or any other relevant information.

Figure 2:
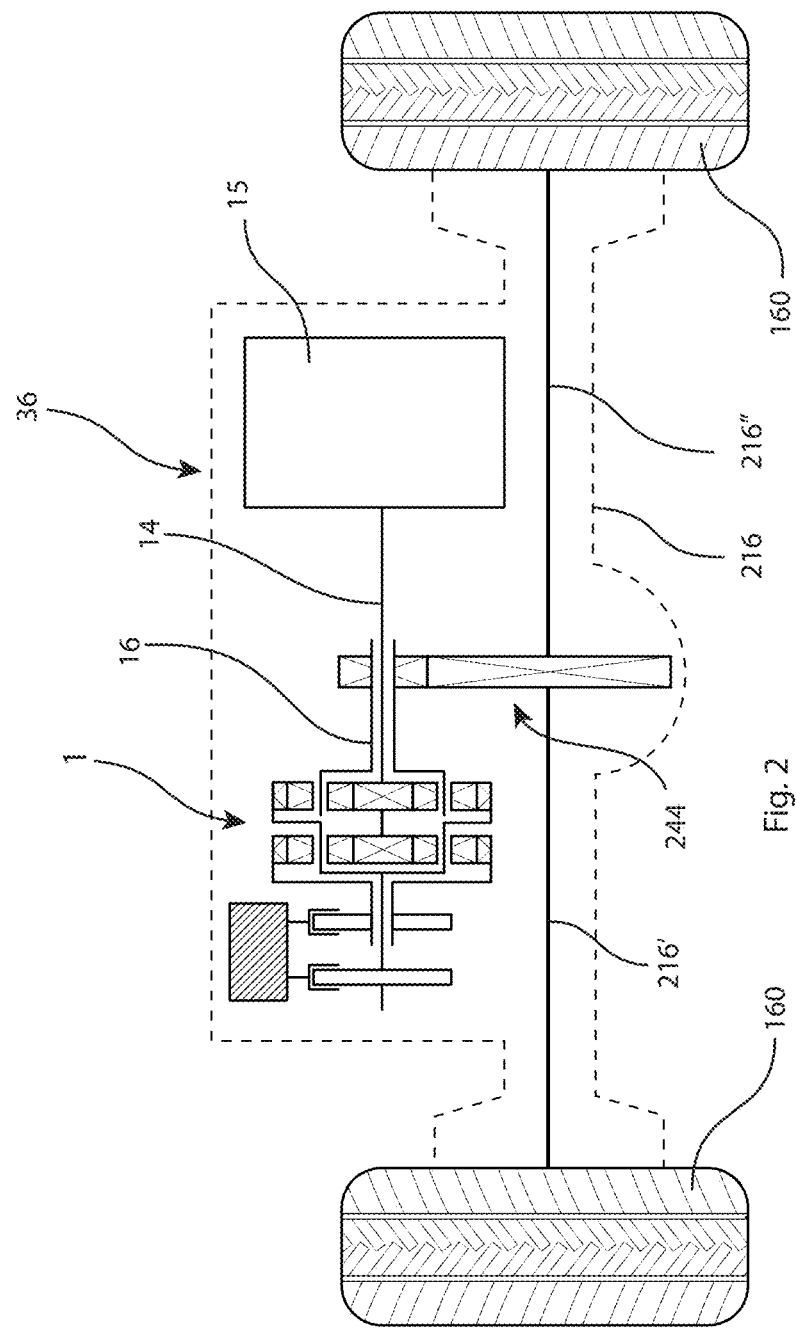
FIG. 2 is a schematic side view of a powertrain comprising a transmission arrangement according to an example embodiment.

The working machine 31 is thus propelled by a powertrain 36, see FIG. 2, including the electric motor 15 for propulsion of the working machine 31. In order to describe the powertrain in further detail, reference is therefore now made to FIG. 2, which is a schematic side view of a powertrain comprising a transmission arrangement according to an example embodiment. The FIG. 2 powertrain is exemplified as being adapted to propel the ground engaging members 160 associated with the front propulsion axle 216. The propulsion axle 216 thus at least comprises the above described drive shafts 216', 216" arranged at the opposite side 203 of the vehicle 31. However, the FIG. 2 powertrain may be used for propelling any ground engaging member or members, for instance the ground engaging members associated with the drive shafts arranged at the load dumping side 202 of the vehicle 31.

Irrespective of the intended use, the FIG. 2 powertrain 34 comprises an electric motor 15, a set of ground engaging members 160 and a transmission arrangement 1 comprising an input shaft 14 and an output shaft 16. The electric motor 15 is adapted to feed power to the input shaft 14 and the output shaft 16 is adapted to feed power to the set of ground engaging members 160.

Purely by way of example, and as indicated in FIG. 2, an output shaft of the electric motor 15 may be rotationally fixedly connected to the input shaft 14. However, it is also envisaged that the output shaft of the electric motor 15 may be connected to the input shaft 14 via one or more other components, such as one or more transmission components not shown in FIG. 2.

Furthermore, the output shaft 16 may be connected to the set of ground engaging members 160 via a gear set 244, such as a cylindrical gear set 244, and further via the drive shafts 216', 216" accommodated within and/or forming part of the previously described propulsion axle 216. However, it is also envisaged that the output shaft 16 may be connected to the set of ground engaging members 160 in other ways. For instance, it is contemplated that embodiments of the powertrain 34 may comprise an output shaft 16 that is adapted to be connected to the set of ground engaging members 160 using other or fewer intermediate components than what has been exemplified above with reference to FIG. 2. As a non-limiting example, it is envisaged that the output shaft 16 may be rotationally fixedly connected to a ground engaging member 160. For instance, it is contemplated that the powertrain 34 may form a hub motor assembly for a vehicle, such as a working machine.

Figure 3:
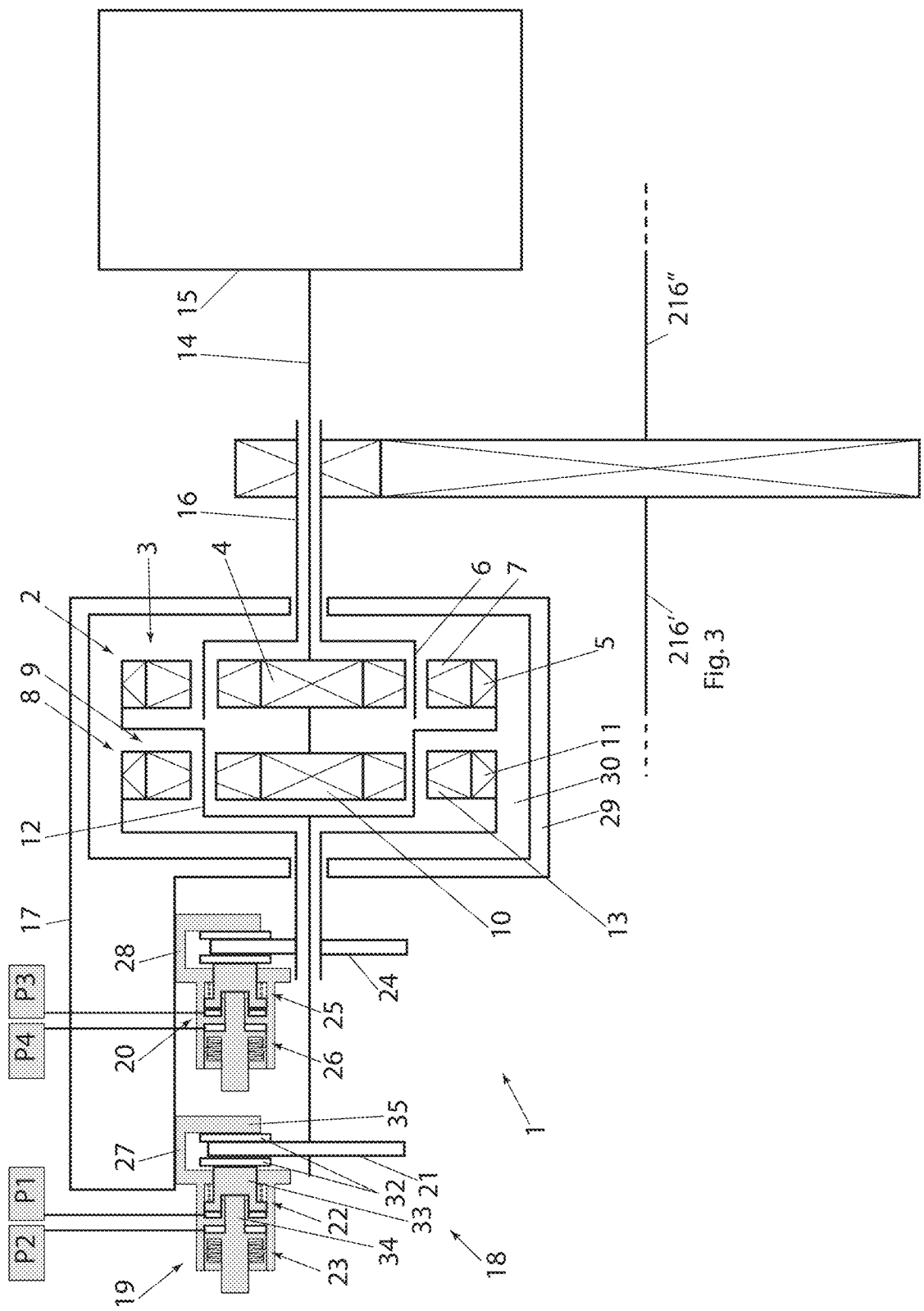
FIG. 3 is a schematic side view of a transmission arrangement according to an example embodiment.

In order to describe the transmission arrangement 1 in further detail, reference is made to FIG. 3 which is a schematic side view of a transmission arrangement according to an example embodiment. As can be seen, the transmission arrangement 1 comprises a first planetary gear set 2 comprising a first set of planetary members 3, the first set of planetary members 3 comprising a first sun gear 4, a first ring gear 5 and a first planet carrier 6 carrying a first set of planet gears 7. The first set of planet gears 7 are in meshing engagement with the first ring gear 5 and the first sun gear 4. The transmission arrangement 1 further comprises a second planetary gear set 8 comprising a second set of planetary members 9. The second set of planetary members 9 comprise a second sun gear 10, a second ring gear 11 and a second planet carrier 12 carrying a second set of planet gears 13. The second set of planet gears 13 are in meshing engagement with the second ring gear 11 and the second sun gear 10. As can be seen in FIG. 3, a first member of the first set of planetary members 3 is operatively connected to a first member of the second set of planetary members 9. Also, a second member of the first set of planetary members 3 is operatively connected to a second member of the second set of planetary members 9.

According to the non-limiting example embodiment depicted in FIG. 3, the first member of the first set of planetary members corresponds to the first sun gear 4 and the first member of the second set of planetary members corresponds to the second sun gear 10, which are operatively connected to each other. Also, in the example embodiment depicted in FIG. 3, the second member of the first set of planetary members corresponds to the first ring gear 5, and the second member of the second set of planetary members corresponds to the second planet carrier 12, which are operatively connected to each other.

As illustrated in FIG. 3, the transmission arrangement 1 further comprises: an input shaft 14 connectable to a prime mover 15, the input shaft 14 being operatively connected to the first sun gear 4, an output shaft 16 operatively connected to the first planet carrier 6, a transmission housing 17, and a gear selection arrangement 18 comprising a first brake mechanism 19 and a second brake mechanism 20. The first brake mechanism 19 comprises a first brake disc 21 operatively connected to one of the members of the first set of planetary members 3.

According to the non-limiting example embodiment of FIG. 3, the first brake disc 21 is connected to the first ring gear 5. However, the skilled person would understand that the present disclosure is directed to the control of braking torque applied to the two sets of planetary members and could be implemented on any type of planetary gearbox design controlled by selectively braking/locking rotation of different members of the planetary gear system.

The first brake mechanism 19 further comprises a first normally disengaged brake 22 attached to the transmission housing 17 and configured to act on the first brake disc 21 to control friction between the first brake disc 21 and the first normally disengaged brake 22. Also, the first brake mechanism 19 comprises a first normally engaged brake 23 attached to the transmission housing 17 and configured to act on the first brake disc 21 to control friction between the first brake disc 21 and the first normally engaged brake 23.

The first normally disengaged brake 22 is operable by a first fluid pressure P1 to be forced against the first brake disc 21 by the first fluid pressure P1. Also, the first normally engaged brake 23 is spring biased against the first brake disc 21 and operable by a second fluid pressure P2 to be forced away from the first brake disc 21 by the second fluid pressure P2.

The second brake mechanism 20 comprises a second brake disc 24 operatively connected to one of the members of the second set of planetary members 9. According to the non-limiting example embodiment of FIG. 3, the second brake disc 24 is connected to the second ring gear 11.

The second brake mechanism 20 further comprises a second normally disengaged brake 25 attached to the transmission housing 17 and configured to act on the second brake disc 24 to control friction between the second brake disc 24 and the second normally disengaged brake 25. The second brake mechanism 20 further comprises a second normally engaged brake 26 attached to the transmission housing 17 and configured to act on the second brake disc 24 to control friction between the second brake disc 24 and the second normally engaged brake 26. The second normally disengaged brake 25 is operable by a third fluid pressure P3 to be forced against the second brake disc 24 by the third fluid pressure P3. Also, the second normally engaged brake 26 is spring biased against the second brake disc 24 and operable by a fourth fluid pressure P4 to be forced away from the second brake disc 24 by the fourth fluid pressure P4.

The transmission arrangement 1 is adapted to assume a first gear ratio when the first brake disc 21 is locked to the transmission housing 17 by the first brake mechanism 19 and the second brake disc 24 is rotatable relatively the transmission housing 17. Also the transmission arrangement 1 is adapted to assume a second gear ratio when the second brake disc 24 is locked to the transmission housing 17 by the second brake mechanism 20 and the first brake disc 21 is rotatable relatively the transmission housing 17.

Figure 6:
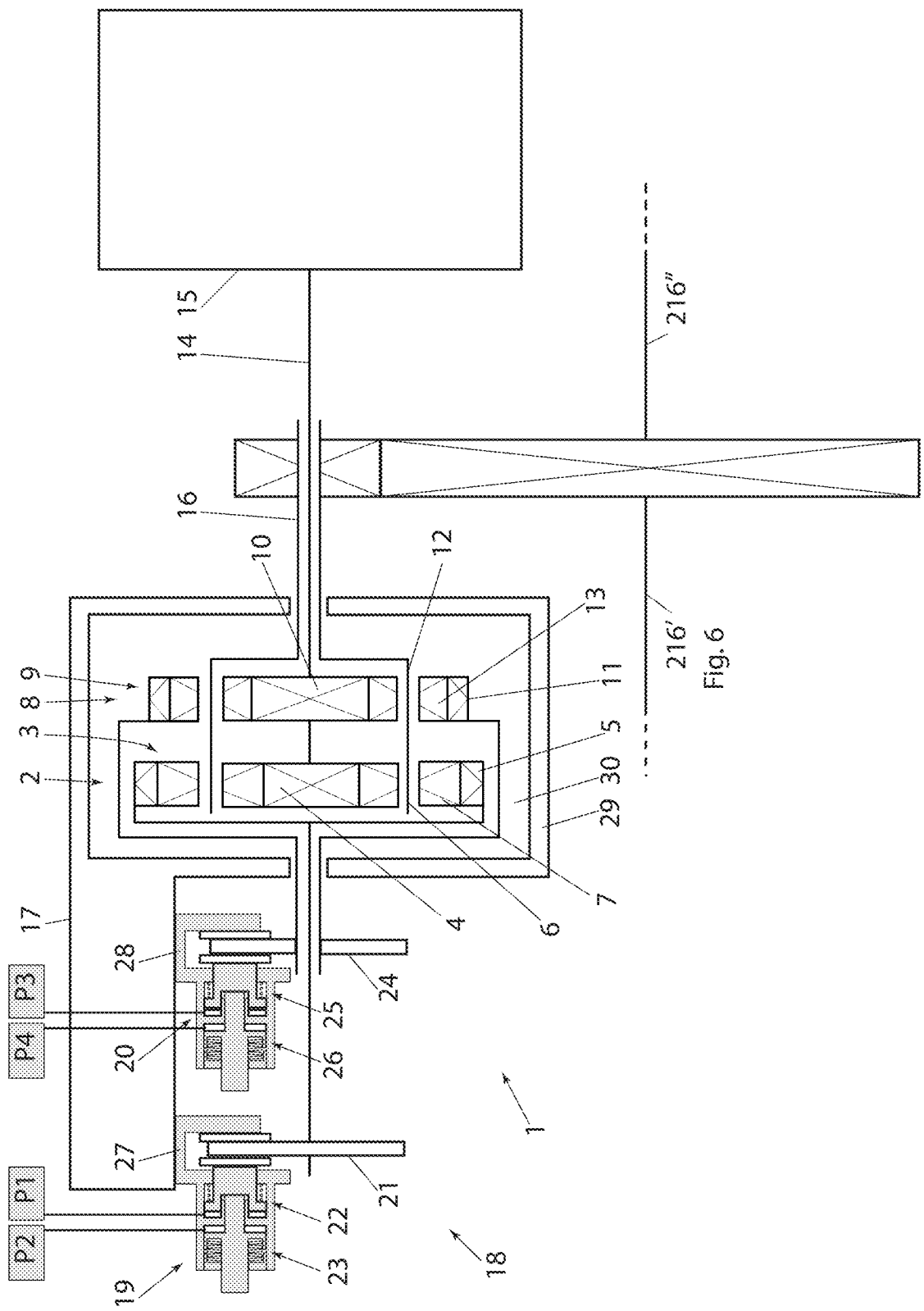
FIG. 6 is a schematic side view of a transmission arrangement according to a second example embodiment.

The present disclosure could be used with planetary gear set arrangements different to the one illustrated in the FIG. 3 embodiment. Such an alternative arrangement is schematically shown in FIG. 6. The first brake mechanism 19 and the second brake mechanism 20 still function in the same way as in the FIG. 3 embodiment.

The FIG. 6 example embodiment differs from the FIG. 3 example embodiment only in how the planetary members are connected to each other. Also, the first and second planetary gear sets 2, 8 have shifted positions.

The FIG. 6 transmission arrangement 1 comprises a first planetary gear set 2 comprising a first set of planetary members 3, wherein the first set of planetary members 3 comprises a first sun gear 4, a first ring gear 5 and a first planet carrier 6 carrying a first set of planet gears 7. The first set of planet gears 7 are in meshing engagement with the first ring gear 5 and the first sun gear 4. The transmission arrangement 1 further comprises a second planetary gear set 8 comprising a second set of planetary members 9. The second set of planetary members 9 comprises a second sun gear 10, a second ring gear 11 and a second planet carrier 12 carrying a second set of planet gears 13. The second set of planet gears 13 are in meshing engagement with the second ring gear 11 and the second sun gear 10.

As can be seen in FIG. 6, a first member of the first set of planetary members 3 is operatively connected to a first member of the second set of planetary members 9. Also, a second member of the first set of planetary members 3 is operatively connected to a second member of the second set of planetary members 9.

According to the non-limiting example embodiment depicted in FIG. 6, the first member of the first set of planetary members corresponds to the first sun gear 4 and the first member of the second set of planetary members corresponds to the second sun gear 10, which are operatively connected to each other. The second member of the first set of planetary members corresponds to the first planet carrier 6, and the second member of the second set of planetary members corresponds to the second planet carrier 12, which are operatively connected to each other. Accordingly, the first set of planet gears 7 and the second set of planet gears 13 share the same planet carrier 6, 12.

As illustrated in FIG. 6, the transmission arrangement 1 further comprises:
 an input shaft 14 connectable to a prime mover 15, the input shaft 14 being operatively connected to the first sun gear 4,
 an output shaft 16 operatively connected to the first planet carrier 6,
 a transmission housing 17, and
 a gear selection arrangement 18 comprising a first brake mechanism 19 and a second brake mechanism 20.

The first brake mechanism 19 comprises a first brake disc 21 operatively connected to one of the members of the first set of planetary members 3.

In the example embodiment depicted in FIG. 6, the first brake disc 21 is connected to the first ring gear 5.

The first brake mechanism 19 further comprises a first normally disengaged brake 22 attached to the transmission housing 17 and configured to act on the first brake disc 21 to control friction between the first brake disc 21 and the first normally disengaged brake 22.

Also, the first brake mechanism 19 comprises a first normally engaged brake 23 attached to the transmission housing 17 and configured to act on the first brake disc 21 to control friction between the first brake disc 21 and the first normally engaged brake 23. The first normally disengaged brake 22 is operable by a first fluid pressure P1 to be forced against the first brake disc 21 by the first fluid pressure P1. Also, the first normally engaged brake 23 is spring biased against the first brake disc 21 and operable by a second fluid pressure P2 to be forced away from the first brake disc 21 by the second fluid pressure P2.

The second brake mechanism 20 comprises a second brake disc 24 operatively connected to one of the members of the second set of planetary members 9. In the non-limiting example embodiment depicted in FIG. 6, the second brake disc 24 is connected to the second ring gear 11.

The second brake mechanism 20 further comprises a second normally disengaged brake 25 attached to the transmission housing 17 and configured to act on the second brake disc 24 to control friction between the second brake disc 24 and the second normally disengaged brake 25.

The second brake mechanism 20 further comprises a second normally engaged brake 26 attached to the transmission housing 17 and configured to act on the second brake disc 24 to control friction between the second brake disc 24 and the second normally engaged brake 26.

The second normally disengaged brake 25 is operable by a third fluid pressure P3 to be forced against the second brake disc 24 by the third fluid pressure P3. Also, the second normally engaged brake 26 is spring biased against the second brake disc 24 and operable by a fourth fluid pressure P4 to be forced away from the second brake disc 24 by the fourth fluid pressure P4.

As for the transmission arrangement 1 of the FIG. 3 embodiment, the transmission arrangement 1 of the FIG. 6 embodiment is adapted to assume a first gear ratio when the first brake disc 21 is locked to the transmission housing 17 by the first brake mechanism 19 and the second brake disc 24 is rotatable relatively the transmission housing 17. Also the transmission arrangement 1 is adapted to assume a second gear ratio when the second brake disc 24 is locked to the transmission housing 17 by the second brake mechanism 20 and the first brake disc 21 is rotatable relatively the transmission housing 17.

Accordingly, both the FIG. 3 and the FIG. 6 embodiments share the same design of the first 19 and second 20 brake mechanisms. Each brake mechanism comprises a normally disengaged brake 22, 25 and a normally engaged brake 23, 26. One embodiment will be described with reference to FIG. 3. In this embodiment, the normally engaged brake 23 and the normally disengaged brake 22 share the same caliper, referred to as the first brake caliper 27, which is a floating caliper. The normally disengaged brake 22 comprises a first piston 33 biased by a suitable first biasing means, such as a disc spring or coil spring, away from the first brake disc 21. Two brake pads 32 are provided between the first piston 33 and a flange 35 of the first brake caliper 27, one brake pad on each side of the brake disc 21. The first fluid pressure P1 can be raised to act on the first piston 33 and overcome the biasing force of the first biasing means to thereby force the brake pads 32 against the brake disc 21 to increase friction between the brake pads 32 and the brake disc 21 in a controlled manner, thereby controlling slipping of the brake disc 21 or preventing rotation of the brake disc 21, such that a gear ratio of the transmission arrangement 1 can be controlled.

The normally engaged brake 23 comprises a second piston 34 biased by a suitable second biasing means, such as a disc spring or coil spring, against the first piston 33 with a higher biasing force than the biasing force of the first biasing means, such that the normally engaged brake 23 is able indirectly act on the brake disc 21 to prevent rotation of the brake disc 21 at least when the second fluid pressure P2 is below a first fluid pressure threshold. The second fluid pressure P2 can be increased to overcome the force of the second biasing means, thereby moving the second piston 34 away from the first piston 33. Hence, the first piston 33 can be controllably pressed against the brake pad independently of the second piston 34, at least when the second fluid pressure P2 is above a second fluid pressure threshold. Accordingly, if the fluid pressures involved are low, for example corresponding to atmospheric pressure, the second biasing means ensures that the first normally engaged brake 23 acts indirectly via the first piston 33 on the brake disc 21 to prevent rotation of the brake disc 21. This enables a parking brake functionality of the first brake mechanism 19.

In other embodiments, the caliper may alternatively be non-floating, i.e. fixed. Also, the normally engaged brake 23 may in other embodiments, alternatively be configured to act directly on a brake pad to control friction on the brake disc 21 independently of the normally disengaged brake 22. In some embodiments, the normally disengaged brake 22 may be provided on one caliper and the normally engaged brake 23 provided on a second caliper.

The first, second, third and fourth fluid pressures P1, P2, P3, P4 are applied by one or more suitable fluid circuits pressurized by one or more pumps, wherein each respective fluid pressure P1, P2, P3, P4 is controlled by a respective valve controlled by a control unit. Any other suitable system for controlling the respective fluid pressure P1, P2, P3, P4 may alternatively be used instead. The fluid may be liquid or gas. The liquid may be hydraulic fluid, such as hydraulic oil.

As mentioned above, the second brake mechanism 20 of the FIG. 3 embodiment has the same design as the first brake mechanism 19, and will therefore not be described in detail.

As mentioned above, transmission arrangement 1 described above can be operated to assume two different gear ratios; A first gear ratio is assumed when the first brake disc 21 is locked to the transmission housing 17 by the first brake mechanism 19 and the second brake disc 24 is rotatable relatively the transmission housing 17. Also, a second gear ratio is assumed when the second brake disc 24 is locked to the transmission housing 17 by the second brake mechanism 20 and the first brake disc 21 is rotatable relatively the transmission housing 17.

Figure 4:
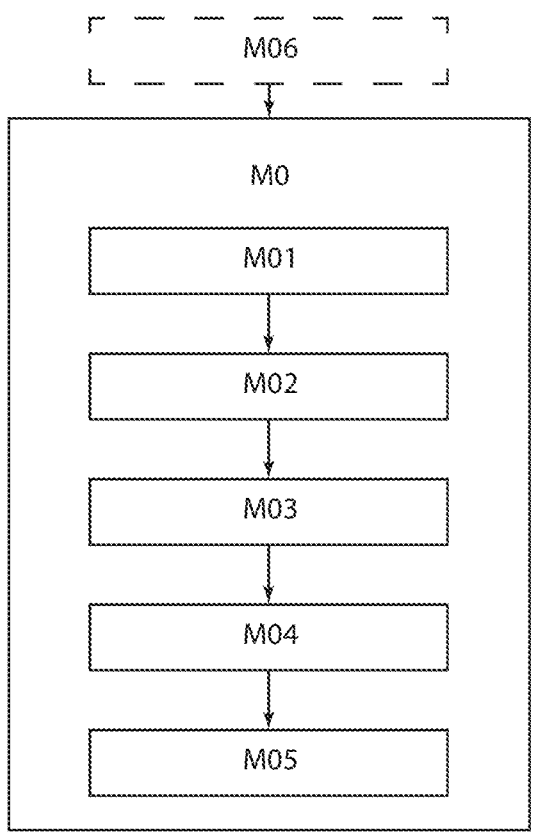
FIG. 4 is a schematic view showing a method comprising changing from a first to a second gear ratio.

In order to change gear ratio from the first gear ratio to the second gear ratio the following method steps are performed (see FIG. 4):

M01 increasing the first fluid pressure P1 such that the first normally disengaged brake 22 engages and locks the first brake disc 21 to the transmission housing 17, M02 increasing the second fluid pressure P2 such that the first normally engaged brake 23 does not lock the first brake disc 21 to the transmission housing 17, M03 gradually decreasing the first fluid pressure P1 whilst gradually increasing the third fluid pressure P3 such that both the first brake mechanism 19 and the second brake mechanism 20 assume a respective slipping condition and eventually transition to a condition in which the first brake disc 21 is free to rotate and the second brake disc 24 is locked to the transmission housing 17 by the second normally disengaged brake 25, M04 decreasing the fourth fluid pressure P4 until the second normally engaged brake 26 locks the second brake disc 24 to the transmission housing 17, and M05 decreasing the third fluid pressure P3 such that the second normally disengaged brake 25 does not lock the second brake disc 24 to the transmission housing 17.

Said change of gear ratio from the first gear ratio to the second gear ratio may be triggered in response to a rotational speed of the output shaft 16 exceeding a first speed threshold T1. The control unit monitors the rotational speed of the output shaft and accordingly triggers shift of gear ratio as needed.

Figure 5:
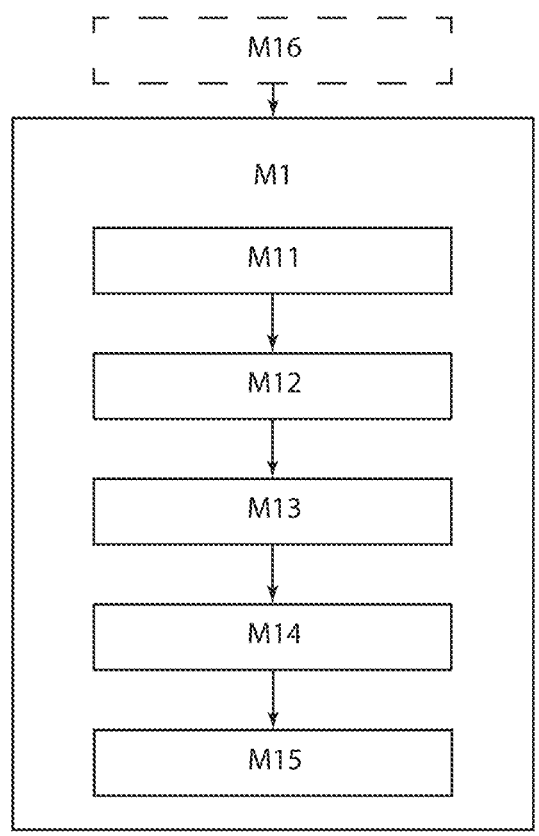
FIG. 5 is a schematic view showing a method comprising changing from a second to a first gear ratio.

In order to change gear ratio from the second gear ratio to the first gear ratio the following method steps are performed (see FIG. 5):

M11 increasing the third fluid pressure P3 such that the second normally disengaged brake 25 engages and locks the second brake disc 24 to the transmission housing 17, M12 increasing the fourth fluid pressure P4 such that the second normally engaged brake 26 does not lock the second brake disc 24 to the transmission housing 17, M13 gradually decreasing the third fluid pressure P3 whilst gradually increasing the first fluid pressure P1 such that both the first brake mechanism 19 and the second brake mechanism 20 assume a respective slipping condition and eventually transition to a condition in which the second brake disc 24 is free to rotate and the first brake disc 21 is locked to the transmission housing 17 by the first normally disengaged brake 22, M14 decreasing the second fluid pressure P2 until the first normally engaged brake 23 locks the first brake disc 21 to the transmission housing 17, and M15 decreasing the first fluid pressure P1 such that the first normally disengaged brake 22 does not lock the first brake disc 21 to the transmission housing 17.

Said change of gear ratio from the second gear ratio to the first gear ratio may be triggered in response to a rotational speed of the output shaft 16 subceeding a second speed threshold T2. The control unit monitors the rotational speed of the output shaft and accordingly triggers shift of gear ratio as needed. In other embodiments, the change of gear ratio may be triggered by other logic, or using a manual trigger by the operator of a vehicle. For example, the control unit may instead monitor the rotational speed of the input shaft and trigger change of gear ratio from the first gear ratio to the second gear ratio in response to the rotational speed of the input shaft exceeding a predetermined threshold. Similarly, the control unit may instead monitor the rotational speed of the input shaft and trigger change of gear ratio from the second gear ratio to the first gear ratio in response to the rotational speed of the input shaft subceeding a predetermined threshold.

The transmission housing 17 may comprise a transmission housing wall assembly 29 defining a transmission housing cavity 30 enclosing at least the first 2 and second 8 planetary gear sets, wherein the first 19 and second 20 brake mechanisms are located on one side of the transmission housing wall assembly 29 and the transmission housing cavity 30 is located on an opposite side of the transmission housing wall assembly 29.

The transmission housing cavity 30 may comprise a transmission lubrication liquid.

It is further suggested to provide a working machine 31 comprising the transmission arrangement 1 described above and a prime mover 15 connected to the input shaft 14 of the transmission arrangement 1. The prime mover may be an electric motor. The working machine may for example be an articulated or rigid hauler, a wheel loader, an excavator, or a backhoe loader, although other types of working machines are also feasible.

It is to be understood that the present disclosure is not limited to the embodiments described above and illustrated in the drawings; rather, the skilled person will recognize that many changes and modifications may be made within the scope of the appended claims.

| Table of reference numerals | |
|---|---|
| 1 | transmission arrangement |
| 2 | first planetary gear set |
| 3 | first set of planetary members |
| 4 | first sun gear |
| 5 | first ring gear |
| 6 | first planet carrier |
| 7 | first set of planet gears |
| 8 | second planetary gear set |
| 9 | second set of planetary members |
| 10 | second sun gear |
| 11 | second ring gear |
| 12 | second planet carrier |
| 13 | second set of planet gears |
| 14 | input shaft |
| 15 | prime mover |
| 16 | output shaft |
| 17 | transmission housing |
| 18 | gear selection arrangement |
| 19 | first brake mechanism |
| 20 | second brake mechanism |
| 21 | first brake disc |
| 22 | first normally disengaged brake |
| 23 | first normally engaged brake |
| 24 | second brake disc |
| 25 | second normally disengaged brake |
| 26 | second normally engaged brake |
| 27 | first brake caliper |
| 28 | second brake caliper |
| 29 | transmission housing wall assembly |
| 30 | transmission housing cavity |
| 31 | working machine |
| 32 | brake pad |
| 33 | first piston |
| 34 | second piston |
| 35 | flange of caliper |
| 36 | powertrain |
| 120 | working machine frame |
| 130 | dump body |
| 131 | load receiving area |
| 132 | load dumping end portion |
| 133 | opposite end portion |
| 134 | load receiving area circumference |
| 141 | tilting actuator |
| 160 | ground engaging members |
| 175 | electrical control arrangement |
| 202 | first side |
| 203 | second side |
| 216 | propulsion axles |
| 216', 216" | drive shafts |
| 244 | gear set |
| M0 | changing from first gear ratio to second gear ratio |
| M01 | increasing first fluid pressure |
| M02 | increasing second fluid pressure |
| M03 | assuming slipping condition of both brake discs |
| M04 | decreasing fourth fluid pressure |
| M05 | decreasing third fluid pressure |
| M06 | triggering change from first to second gear ratio |
| M1 | changing from second gear ratio to first gear ratio |
| M11 | increasing third fluid pressure |
| M12 | increasing fourth fluid pressure |
| M13 | assuming slipping condition of both brake discs |
| M14 | decreasing second fluid pressure |
| M15 | decreasing first fluid pressure |
| M16 | triggering change from second to first gear ratio |
| P1 | first fluid pressure |
| P2 | second fluid pressure |
| P3 | third fluid pressure |
| P4 | fourth fluid pressure |

What is claimed is:

1. A transmission arrangement, comprising:
a first planetary gear set comprising a first set of planetary members, the first set of planetary members comprising a first sun gear, a first ring gear and a first planet carrier carrying a first set of planet gears, the first set of planet gears being in meshing engagement with the first ring gear and the first sun gear, a second planetary gear set comprising a second set of planetary members, the second set of planetary members comprising a second sun gear, a second ring gear and a second planet carrier carrying a second set of planet gears, the second set of planet gears being in meshing engagement with the second ring gear and the second sun gear, wherein a first member of the first set of planetary members is operatively connected to a first member of the second set of planetary members, and wherein a second member of the first set of planetary members is operatively connected to a second member of the second set of planetary members, said transmission arrangement further comprising:

an input shaft connectable to a prime mover, the input shaft being operatively connected to the first sun gear, an output shaft operatively connected to the first planet carrier, a transmission housing, and a gear selection arrangement comprising a first brake mechanism and a second brake mechanism, said first brake mechanism comprising:

a first brake disc connected to one of the members of the first set of planetary members, a first normally disengaged brake attached to the transmission housing and configured to act on the first brake disc to control friction between the first brake disc and the first normally disengaged brake, and a first normally engaged brake attached to the transmission housing and configured to act on the first brake disc to control friction between the first brake disc and the first normally engaged brake, said first normally disengaged brake being operable by a first fluid pressure (P1) to be forced against the first brake disc by the first fluid pressure (P1), and said first normally engaged brake being spring biased against the first brake disc and operable by a second fluid pressure (P2) to be forced away from the first brake disc by the second fluid pressure (P2), said second brake mechanism comprising:

a second brake disc connected to one of the members of the second set of planetary members, a second normally disengaged brake attached to the transmission housing and configured to act on the second brake disc to control friction between the second brake disc and the second normally disengaged brake, and a second normally engaged brake attached to the transmission housing and configured to act on the second brake disc to control friction between the second brake disc and the second normally engaged brake, said second normally disengaged brake being operable by a third fluid pressure (P3) to be forced against the second brake disc by the third fluid pressure (P3), and said second normally engaged brake being spring biased against the second brake disc and operable by a fourth fluid pressure (P4) to be forced away from the second brake disc by the fourth fluid pressure (P4), wherein the transmission arrangement is adapted to assume a first gear ratio when the first brake disc is locked to the transmission housing by the first brake mechanism and the second brake disc is rotatable relatively the transmission housing, and wherein the transmission arrangement is adapted to assume a second gear ratio when the second brake disc is locked to the transmission housing by the second brake mechanism and the first brake disc is rotatable relatively the transmission housing.

2. The transmission arrangement according to claim 1, wherein the first brake mechanism comprises a first brake caliper and wherein the second brake mechanism comprises a second brake caliper.

3. The transmission arrangement according to claim 1, wherein the transmission housing comprises a transmission housing wall assembly defining a transmission housing cavity enclosing at least the first and second planetary gear sets, wherein the first and second brake mechanisms are located on one side of the transmission housing wall assembly and the transmission housing cavity is located on an opposite side of the transmission housing wall assembly.

4. The transmission arrangement according to claim 3, wherein the transmission housing cavity comprises a transmission lubrication liquid.

5. The transmission arrangement according to claim 1, wherein the first brake disc is connected to the first ring gear.

6. The transmission arrangement according to claim 1, wherein the second brake disc is connected to the second ring gear.

7. The transmission arrangement according to claim 1, wherein the first ring gear is operatively connected to the second planet carrier.

8. The transmission arrangement according to claim 1, wherein the first sun gear is operatively connected to the second sun gear.

9. A method of operating the gear selection arrangement of a transmission arrangement according to claim 1, said method comprising:

changing gear ratio from the first gear ratio to the second gear ratio by:

increasing the first fluid pressure (P1) such that the first normally disengaged brake engages and locks the first brake disc to the transmission housing, increasing the second fluid pressure (P2) such that the first normally engaged brake does not lock the first brake disc to the transmission housing, gradually decreasing the first fluid pressure (P1) whilst gradually increasing the third fluid pressure (P3) such that both the first brake mechanism and the second brake mechanism assume a respective slipping condition and eventually transition to a condition in which the first brake disc is free to rotate and the second brake disc is locked to the transmission housing by the second normally disengaged brake, decreasing the fourth fluid pressure (P4) until the second normally engaged brake locks the second brake disc to the transmission housing, and decreasing the third fluid pressure (P3) such that the second normally disengaged brake does not lock the second brake disc to the transmission housing.

10. The method according to claim 9, comprising:

triggering said change of gear ratio from the first gear ratio to the second gear ratio in response to a rotational speed of the output shaft exceeding a first speed threshold (T1).

11. A method of operating the gear selection arrangement of a transmission arrangement according to claim 1, said method comprising:

changing gear ratio from the second gear ratio to the first gear ratio by:

increasing the third fluid pressure (P3) such that the second normally disengaged brake engages and locks the second brake disc to the transmission housing, increasing the fourth fluid pressure (P4) such that the second normally engaged brake does not lock the second brake disc to the transmission housing, gradually decreasing the third fluid pressure (P3) whilst gradually increasing the first fluid pressure (P1) such that both the first brake mechanism and the second brake mechanism assume a respective slipping condition and eventually transition to a condition in which the second brake disc is free to rotate and the first brake disc is locked to the transmission housing by the first normally disengaged brake, decreasing the second fluid pressure (P2) until the first normally engaged brake locks the first brake disc to the transmission housing, and decreasing the first fluid pressure (P1) such that the first normally disengaged brake does not lock the first brake disc (21) to the transmission housing.

12. The method according to claim 11, comprising triggering said change of gear ratio from the second gear ratio to the first gear ratio in response to a rotational speed of the output shaft subceeding a second speed threshold (T2).

13. A working machine comprising a transmission arrangement according to claim 1, and comprising said prime mover, wherein said prime mover is connected to the input shaft of the transmission arrangement.

* * * * *